(12) United States Patent
Cysewski

(10) Patent No.: US 11,021,265 B2
(45) Date of Patent: Jun. 1, 2021

(54) APPARATUS, SYSTEM, AND METHOD FOR A STOWAGE BIN LIGHTING INTERFACE

(71) Applicant: The Boeing Company, Chicago, IL (US)

(72) Inventor: Sean R. Cysewski, Chicago, IL (US)

(73) Assignee: The Boeing Company, Chicago, IL (US)

( * ) Notice: Subject to any disclaimer, the term of this patent is extended or adjusted under 35 U.S.C. 154(b) by 411 days.

(21) Appl. No.: 15/993,207

(22) Filed: May 30, 2018

(65) Prior Publication Data

US 2019/0367181 A1 Dec. 5, 2019

(51) Int. Cl.
*B64D 47/02* (2006.01)
*B64D 11/00* (2006.01)

(52) U.S. Cl.
CPC ............ *B64D 47/02* (2013.01); *B64D 11/003* (2013.01)

(58) Field of Classification Search
CPC .............................. B64D 47/02; B64D 11/003
USPC .................................................. 362/478, 479
See application file for complete search history.

(56) References Cited

U.S. PATENT DOCUMENTS

| 7,266,917 | B2 | 9/2007 | Ryan et al. |
| 10,222,029 | B2 * | 3/2019 | Camp, III ............... F21V 13/04 |
| 2005/0050781 | A1 | 3/2005 | Duim et al. |

* cited by examiner

*Primary Examiner* — Thomas M Sember
(74) *Attorney, Agent, or Firm* — McDonnell Boehnen Hulbert & Berghoff LLP

(57) ABSTRACT

Example implementations relate to stowage bin lighting interfaces. An example apparatus includes a panel portion, and a set of fasteners configured to couple the panel portion to a stowage bin such that a curvature of the panel portion aligns with a curvature of the exterior of the stowage bin. Each fastener is configured to extend through the stowage bin into a back portion of the panel portion to couple the panel portion to the stowage bin. Aligning the curvature of the panel portion with the curvature of the exterior of the stowage bin enables the stowage bin to open and close when the panel portion is coupled. The apparatus further includes a lighting interface configured to couple between the panel portion and the exterior of the stowage bin at a position that enables the lighting interface to provide illumination through openings in the panel portion and ambient lighting.

20 Claims, 9 Drawing Sheets

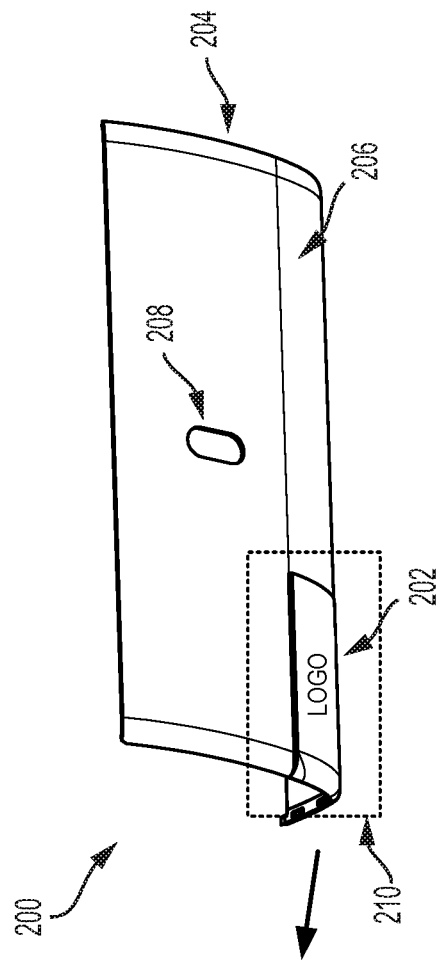
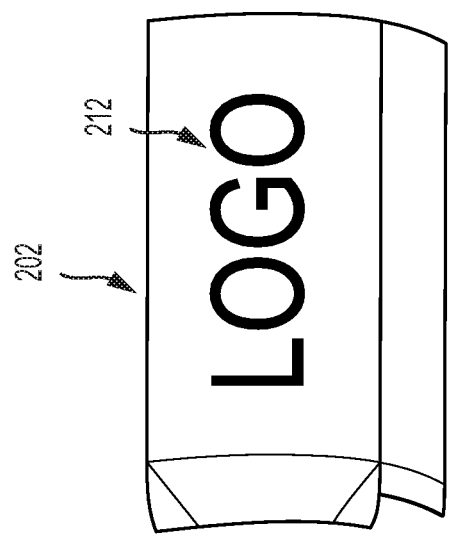
FIG. 7

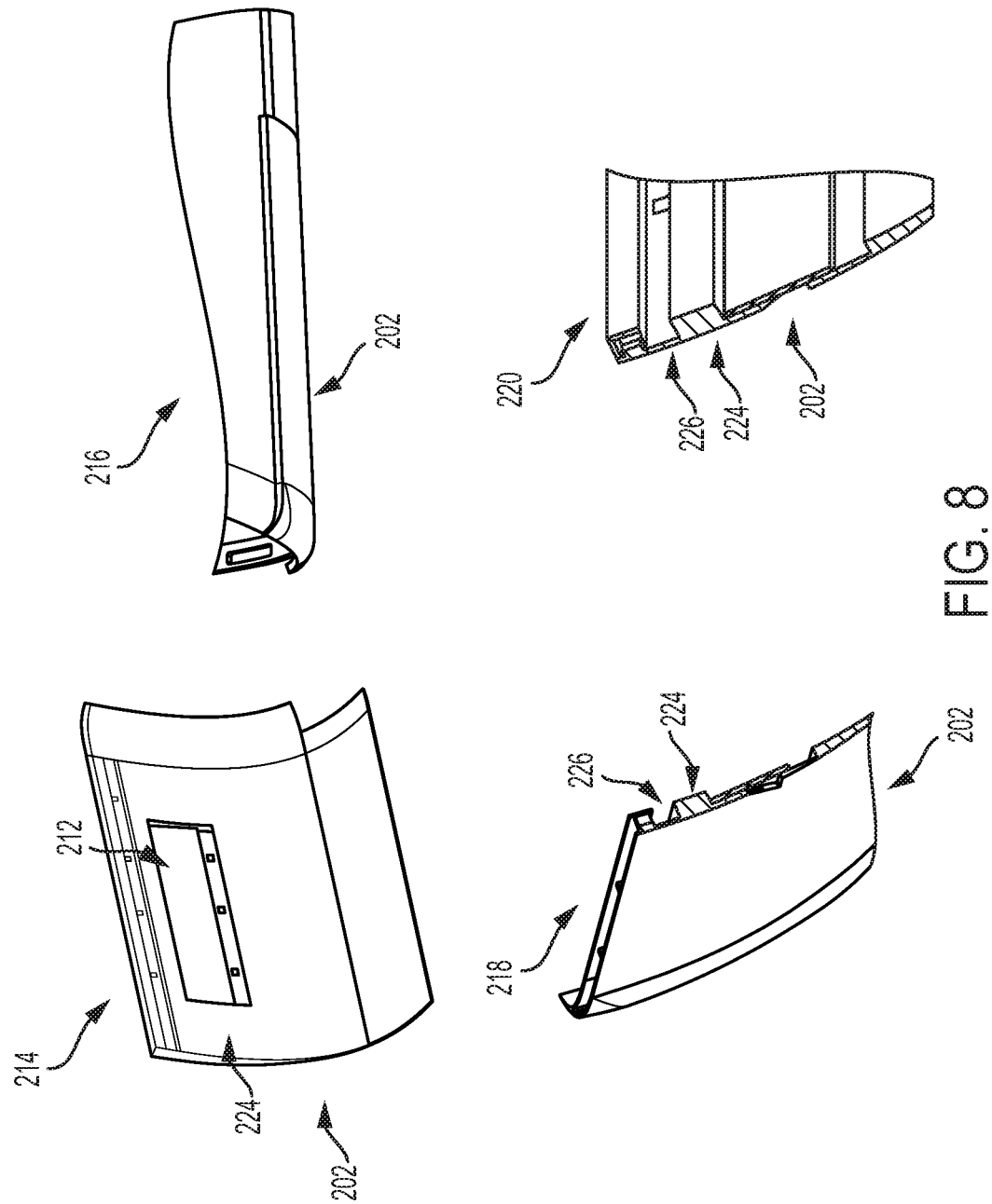

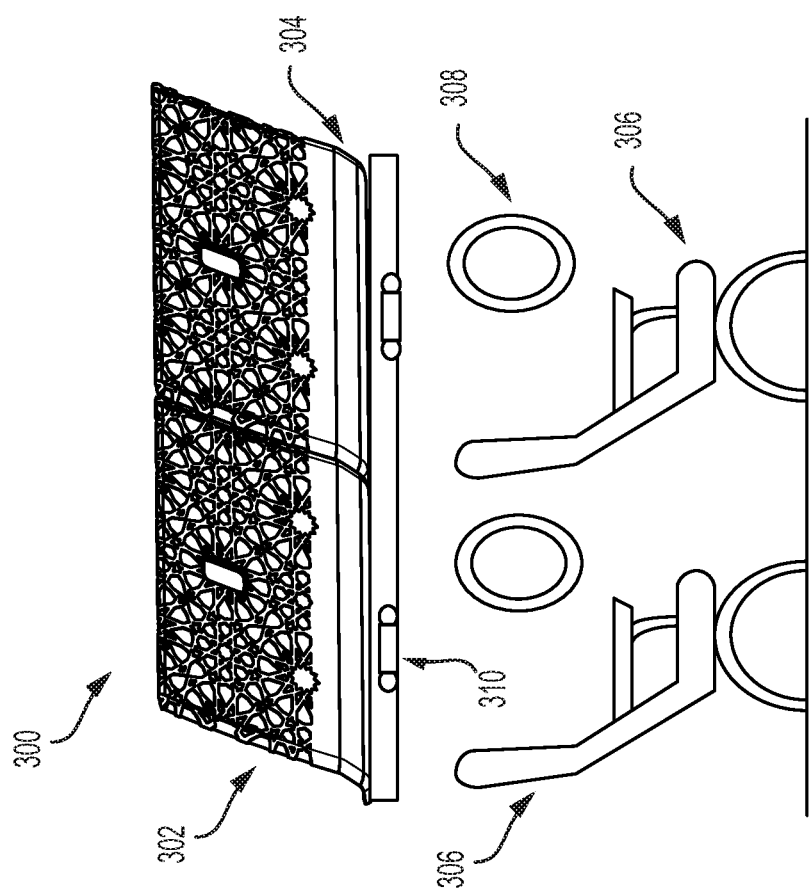

400

COUPLE A PANEL PORTION TO AN EXTERIOR OF A STOWAGE BIN USING A SET OF FASTENERS SUCH THAT A CURVATURE OF THE PANEL PORTION ALIGNS WITH A CURVATURE OF THE EXTERIOR OF THE STOWAGE BIN, WHEREIN COUPLING THE PANEL PORTION TO THE EXTERIOR OF THE STOWAGE BIN INVOLVES ARRANGING EACH FASTENER TO EXTEND THROUGH THE STOWAGE BIN INTO A BACK PORTION OF THE PANEL PORTION TO COUPLE THE PANEL PORTION TO THE EXTERIOR OF THE STOWAGE BIN, AND WHEREIN ALIGNING THE CURVATURE OF THE PANEL PORTION WITH THE CURVATURE OF THE EXTERIOR OF THE STOWAGE BIN ENABLES THE STOWAGE BIN TO OPEN AND CLOSE WHEN THE PANEL PORTION IS COUPLED TO THE EXTERIOR OF THE STOWAGE BIN

— 402

COUPLE A LIGHTING INTERFACE TO THE BACK PORTION OF THE PANEL PORTION BETWEEN THE PANEL PORTION AND THE EXTERIOR OF THE STOWAGE BIN AT A POSITION THAT ENABLES THE LIGHTING INTERFACE TO PROVIDE ILLUMINATION THROUGH ONE OR MORE OPENINGS IN THE PANEL PORTION AND AMBIENT LIGHTING SURROUNDING THE PANEL PORTION

GENERATE A PANEL HAVING A WIDTH THAT CORRESPONDS TO A WIDTH OF THE EXTERIOR OF THE STOWAGE BIN USING AN INJECTION MOLDING PROCESS

— 406

MODIFY THE PANEL TO FORM THE PANEL PORTION USING A WATER JETTING PROCESS

MODIFY OPERATION OF THE LIGHTING INTERFACE BASED ON A STATUS OF OPERATION OF A VEHICLE CONFIGURED WITH THE STOWAGE BIN, WHEREIN MODIFYING OPERATION OF THE LIGHTING INTERFACE COMPRISES ADJUSTING A BRIGHTNESS OR COLOR OF ILLUMINATION PROVIDED BY THE LIGHTING INTERFACE
— 410

APPARATUS, SYSTEM, AND METHOD FOR A STOWAGE BIN LIGHTING INTERFACE

FIELD

The present disclosure relates generally to attachable display or lighting features for stowage bins, and more particularly to, examples for stowage bin lighting interfaces.

BACKGROUND

A stowage bin is a type of compartment configured to hold items (e.g., luggage) and can be typically found in various types of transportation vehicles, such as buses, trains, and aircrafts. A vehicle often includes stowage bins as an option for securely storing items during operation of the vehicle. For example, an aircraft often includes stowage bins positioned above passengers' seats to enable safe and secure storage for luggage and other items during a flight.

Stowage bins are normally constructed without display or decorative features. Rather, a stowage bin is often configured with a curvature that maximizes the inner storage space while enabling the stowage bin to open and close in a compact manner. This curvature along with the compact design of a stowage bin can make modifying the visible portions of the stowage bin difficult. As a result, display features used to enhance the appearance of a stowage bin are often limited to two-dimensional decorations applied to the stowage bin using some form of adhesive similar to a poster taped to a wall.

SUMMARY

In one example, an apparatus is described comprising a panel portion and a set of fasteners configured to couple the panel portion to an exterior of a stowage bin such that a curvature of the panel portion aligns with a curvature of the exterior of the stowage bin. Each fastener is configured to extend through the stowage bin into a back portion of the panel portion to couple the panel portion to the exterior of the stowage bin. Aligning the curvature of the panel portion with the curvature of the exterior of the stowage bin enables the stowage bin to open and close when the panel portion is coupled to the exterior of the stowage bin. The apparatus further includes a lighting interface configured to couple to the back portion of the panel portion between the panel portion and the exterior of the stowage bin at a position that enables the lighting interface to provide illumination through one or more openings in the panel portion and ambient lighting surrounding the panel portion when the panel portion is coupled to the exterior of the stowage bin.

In another example, a system is described. The system includes a stowage bin, one or more fasteners, a panel portion, and a lighting interface. The panel portion is coupled to an exterior of the stowage bin via the one or more fasteners such that a curvature of the panel portion aligns with a curvature of the exterior of the stowage bin. Each fastener extends through the stowage bin and into a back portion of the panel portion in order to couple the panel portion to the exterior of the stowage bin. Aligning the curvature of the panel portion with the curvature of the exterior of the stowage bin enables the stowage bin to open and close. The lighting interface is coupled to the back portion of the panel portion between the panel portion and the exterior of the stowage bin at a position that enables the lighting interface to provide illumination through one or more openings in the panel portion and ambient lighting surrounding the panel portion.

In a further example, a method is described. The method includes coupling a panel portion to an exterior of a stowage bin using a set of fasteners such that a curvature of the panel portion aligns with a curvature of the exterior of the stowage bin. In particular, coupling the panel portion to the exterior of the stowage bin involves arranging each fastener to extend through the stowage bin into a back portion of the panel portion to couple the panel portion to the exterior of the stowage bin. Aligning the curvature of the panel portion with the curvature of the exterior of the stowage bin enables the stowage bin to open and close when the panel portion is coupled to the exterior of the stowage bin. The method further includes coupling a lighting interface to the back portion of the panel portion between the panel portion and the exterior of the stowage bin at a position that enables the lighting interface to provide illumination through one or more openings in the panel portion and ambient lighting surrounding the panel portion.

The features, functions, and advantages that have been discussed can be achieved independently in various examples or may be combined in yet other examples further details of which can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings, wherein:

FIG. 7 illustrates a system, according to an example implementation.

FIG. 8 illustrates multiple views of the system, according to an example implementation.

FIG. 9 illustrates another apparatus positioned inside a vehicle, according to an example implementation.

FIG. 10 shows a flowchart of a method, according to an example implementation.

FIG. 11 shows a flowchart of another method for use with the method shown in FIG. 10, according to an example implementation.

DETAILED DESCRIPTION

Figure 1:
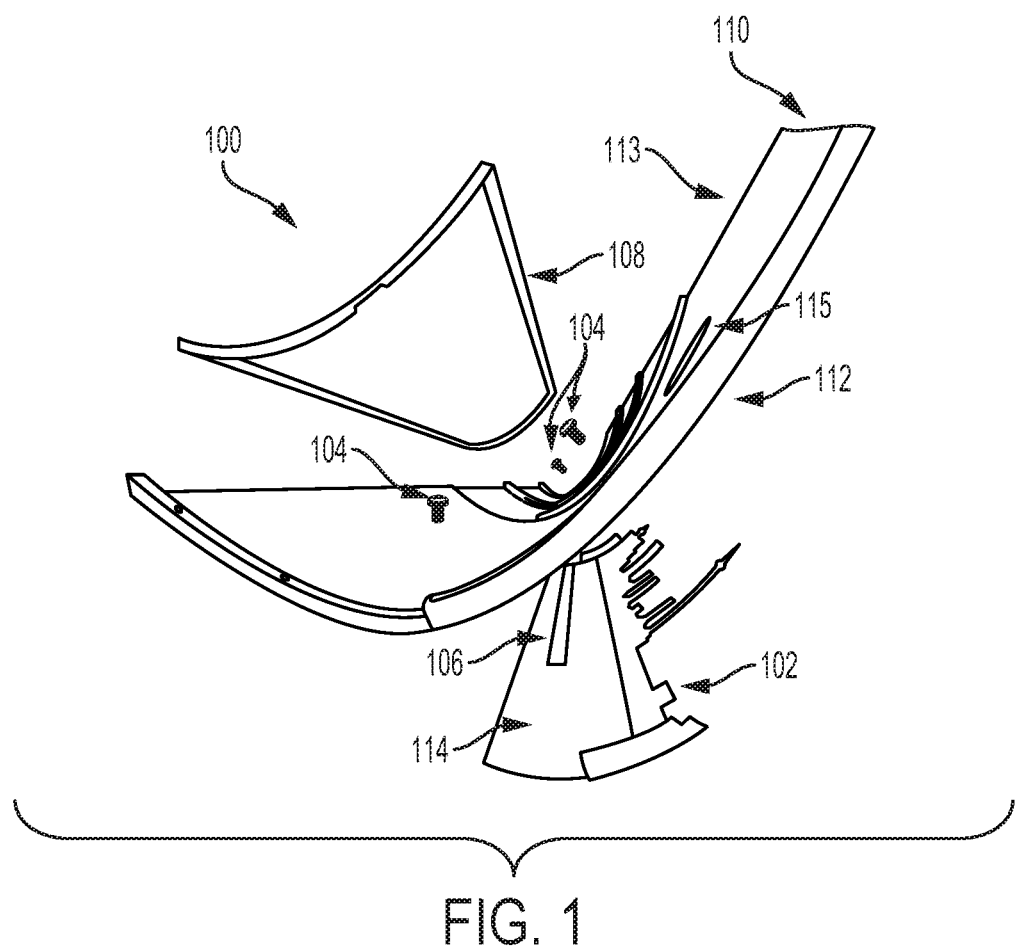
FIG. 1 is a side view of an apparatus, according to an example implementation.

Disclosed examples will now be described more fully hereinafter with reference to the accompanying drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

Example implementations describe variations of stowage bin lighting interfaces, which can be used, for example, as lighted branding features. An example stowage bin lighting interface can be coupled to an exterior of a stowage bin to modify the appearance of the stowage bin while still enabling the stowage bin to operate as designed (i.e., open and close properly). The example stowage bin lighting interface can include a particular design, such as a logo associated with the vehicle housing the stowage bin, an advertisement, or another decorative design aimed to enhance the aesthetic appeal of the stowage bin. In some examples, the stowage bin lighting interface is a removable feature that is connected to and disconnected from the stowage bin via a set of fasteners. In addition, some example stowage bin lighting interfaces can further include multiple lighting interfaces configured to illuminate aspects of the designs.

To further illustrate, an example apparatus for implementing a stowage bin lighting interface can include a panel portion, a set of fasteners, and a lighting interface, among other possible components. The panel portion can include a design generated to enhance or otherwise modify the appearance of the exterior of a stowage bin. For example, the panel portion can include a mural or another form of decorative design. A decorative design can include patterns of colors or represent a scene (e.g., nature or city skyline), among other possibilities. The panel portion can also represent information, such as a company logo of the company that owns the vehicle housing the stowage bin. In some examples, the panel portion can be part of a larger mural that extends across multiple stowage bins. In such a configuration, each stowage bin could have a disconnected part of the mural to allow the stowage bins to open and close as designed while also enabling the different parts to form the mural when all the stowage bins are closed.

The design and overall appearance of the panel portion of an example apparatus or system can depend on how the panel portion is created. In some examples, the panel portion can be generated using an injection molding process, which is a manufacturing process for producing parts by injecting molten material into a mold. A variety of molten materials can be used to form the panel portion, such as metals, glasses, elastomers, confections, and thermoplastic and thermosetting polymers. In some examples, the material used for creating the panel portion can depend on the type of stowage bin and the type of vehicle that the stowage bin is positioned within. For example, a thermoplastic or polymer might be used to enhance the stowage bins on an aircraft to keep the stowage bin lighted branding features lightweight.

In an example implementation, the injection molding process can involve generating a panel with a width that corresponds to a width of the exterior of the stowage bin. With this width, the panel portion can extend across an entire exterior of the stowage bin. The panel can then be further modified to form the particular design for the panel portion using a shaping process (e.g., a water jetting process). The panel can be cut or shaped to form a design, such as a logo, city skyline, graphical design, etc. In further examples, the panel portion can be generated at a smaller size to fit only a portion of the exterior of the stowage bin. In these examples, generating the panel in a smaller initial size before shaping the panel for the stowage bin lighted branding feature can reduce the amount of materials used.

After a panel portion of an apparatus is generated, the panel portion can be coupled to a stowage bin using a set of fasteners. For example, a set of machine screws can be used to position and secure the panel portion against the exterior of the stowage bin. As such, the quantity, type, and configuration of the fasteners can vary within examples. For instance, some examples use machine screws that can extend from inside the stowage bin, through the exterior of the stowage bin, and into a back portion of the panel to securely couple the panel portion to the stowage bin. The positioning of the fasteners relative to the panel portion can depend on the design of the panel portion. For example, a panel portion with a larger design might require additional fasteners or fasteners to be spaced out accordingly to securely couple the panel portion to the stowage bin. In additional examples, the set of fasteners can consist of a single fastener.

In some examples, when coupling the panel portion to the exterior of the stowage bin, the fasteners can extend through the stowage bin into a back portion of the panel portion to hide the presence of the fasteners from a passenger viewing the panel portion coupled to the exterior of the stowage bin. As a result, the fasteners can securely couple the panel portion to the stowage bin without impacting the aesthetic appeal of any decorative feature incorporated in the panel portion.

In addition, the fasteners can couple into coupling holes that include extra space. The extra space can enable adjustments to be made while coupling the panel portion to the exterior of the stowage bin. For instance, the panel portion can be shifted in a direction to align the panel portion with the stowage bin. As a result, the panel portion can be connected to the stowage bin at a position that enables the stowage bin to open and close without interference from the apparatus.

The panel portion can have a curvature that matches the curvature of the exterior of the stowage bin. In such a configuration, the set of fasteners can couple the panel portion to the exterior of the stowage bin such that the curvature of the panel portion aligns with the exterior of the stowage bin. By generating the panel portion with a curvature that can align with the curvature of the exterior of the stowage bin, the panel portion can be connected to the stowage bin while still allowing the stowage bin to operate as intended (i.e., open and close without interference). In other examples, the panel portion can have a flat design that enables the panel portion to couple and extend out from the exterior of the stowage bin.

The back of the panel portion can include one or more raised portions such that one or more gaps exist between the panel portion and the exterior of the stowage bin when the panel portion is coupled to the stowage bin. For instance, a gap can be formed between an upper portion of the panel portion such that ambient lighting from a lighting interface can visibly highlight the upper portion of the panel portion. The raised portions can also cause the panel portion to appear to have a three-dimensional (3D) appearance that can enhance the appearance of the design.

The example apparatus can further include one or more lighting interfaces, which can couple to the back portion of the panel portion between the panel portion and the exterior of the stowage bin. At this position, the lighting interface can provide illumination through any openings in the panel portion as well as ambient light surrounding the panel portion. The lighting interface can include various types of lights, such as light emitting diodes (LEDs). In addition, some examples can include multiple lighting interfaces that can be located at different positions.

Illumination from the lighting interface can be used to enhance the appearance of aspects of the panel portion. For example, illumination from the lighting interface can help draw focus towards a logo or another portion of the panel portion. In addition, a color scheme provided by the lighting interface can contribute to the aesthetic appeal of the panel portion. For instance, the lighting interface can provide illumination in colors that enhance the design of the panel portion.

The lighting interface can receive power through a power wire connected to a power source. The power source can be a power source of the vehicle configured to supply power to other lights. In some implementations, the power wire can extend to the power source through an opening in a side-end of the stowage bin. In particular, the opening in the side-end of the stowage bin can be positioned proximate an opening hinge of the stowage bin such that the power wire of the lighting interface remains stationary when the stowage bin is opened or closed. For example, the opening can be positioned at a range of 10-100 mm from the opening hinge of the stowage bin. In additional examples, the power wire can further extend through a containment extrusion positioned exterior from the stowage bin and proximate the opening hinge of the stowage bin. For example, the containment extrusion can have a position within a few millimeters (e.g., 10-100 mmm) from the opening hinge of the stowage bin. In other examples, the containment extrusion can have a position within a different range from the opening hinge of the stowage bin. The containment extrusion can align and conceal the power wire outside the stowage bin. This can prevent unwanted tampering by passengers as well as prevent the power wire from reducing from the aesthetic appeal of the panel portion.

The power wire of the lighting interface can extend to a power source through an opening in the stowage bin positioned behind the panel portion and proximate a central opening hinge of the stowage bin when the panel portion is coupled to the exterior of the stowage bin. For example, the opening can have a position within 10-100 millimeters from the central opening hinge of the stowage bin. In other examples, the opening can have a position within a different range from the central opening hinge of the stowage bin. In this configuration, the power wire of the lighting interface can remain stationary when the storage bin is opened or closed while also not appearing visible to passengers.

The example apparatus can further include an interior bin cover configured to couple to an interior of the stowage bin such that the interior bin cover conceals the set of fasteners when the set of fasteners are coupling the panel portion to the exterior of the stowage bin. In some examples, the interior bin cover includes a curvature that enables the interior bin cover to align with a curvature of the interior of the stowage bin. By aligning with the interior of the stowage bin, the interior bin can conceal the fasteners while also minimizing the amount of space taken up inside the stowage bin.

Referring now to the Figures, FIG. 1 is a side view of an apparatus 100, according to an example implementation. The apparatus 100 represents an example configuration for a stowage bin lighting interface. As shown in FIG. 1, the apparatus 100 includes a panel portion 102, a set of fasteners 104, a lighting interface 106, and an interior bin cover 108. In addition, FIG. 1 also depicts a stowage bin 110 to illustrate an example manner in which the apparatus 100 can be coupled to an exterior 112 of the stowage bin 110 using the set of fasteners 104. Other implementations for stowage bin lighted branding features can include more or fewer components in different arrangements. Additional configurations are described below.

The panel portion 102 represents a component of the apparatus 100 configured to enhance or generally modify an appearance of the exterior 112 of the stowage bin 110. In particular, the panel portion 102 is shown depicting a raised decorative city skyline, but can represent other designs within examples. For instance, in other examples, the panel portion 102 can incorporate information or the logo of a company, such the logo of the airline that owns the aircraft equipped with the stowage bin 110.

The panel portion 102 can make up a separate portion of a larger decorative feature (e.g., a mural) that extends across multiple stowage bins. In such a configuration, each stowage bin in a series of stowage bins can have stowage bin lighted branding features that together produce the larger decorative feature. Further, in some implementations, the panel portion 102 can represent a portion of a larger design that incorporates designs placed on other portions of the vehicle housing the stowage bin 110. For example, stowage bin lighted branding features positioned on stowage bins in an aircraft can be part of a design that incorporates features placed on other portions of the aircraft, such as the ceiling or inner sides.

The generation, material or materials used, and configuration of the panel portion 102 can differ within examples. For example, creating the panel portion 102 can depend on the material used, the size and design of the panel portion 102, and other aspects of the panel portion 102. In some examples, the panel portion 102 is generated using a material that is based on the type of vehicle housing the stowage bin 110. For instance, a lighter weight material (e.g., plastic) might be used for the panel portion 102 when the apparatus 100 is coupled to a stowage bin 110 inside an aircraft.

The panel portion 102 can be generated in a material (e.g., plastic) using an injection molding process. As indicated above, the injection molding process is a manufacturing process for producing parts by injecting molten material into a mold. The injection molding process can be used to give curvature to a panel that matches the curvature of the exterior 112 of the stowage bin 110. The panel then can be configured (e.g., cut) into the panel portion 102. Other processes may be used to generate the panel portion 102. For example, a 3D additive manufacturing process can be used to generate the panel portion 102.

The generation process can also incorporate a water jetting process to shape details into the plastic making up the panel portion 102. The water jetting process can remove portions of the original mold to create openings in the panel portion 102 as well as shape the molded panel into the desired design for the panel portion 102. For instance, the water jetting process can be used to shape the outline of the buildings in the city skyline in the panel portion 102 shown in FIG. 1. Other generation processes can be used. For example, the panel portion 102 can be designed and shaped using 3D printing techniques.

The set of fasteners 104 represent mechanical structures that can be used to couple the panel portion 102 to an exterior of the stowage bin 110. In the example apparatus 100 illustrated in FIG. 1, the set of fasteners 104 are shown as machined screws. Other examples can include other types of fasteners, including combinations of different fasteners. Further, other examples can involve using other materials capable of coupling the panel portion 102 to the exterior 112 of the stowage bin 110. For instance, an adhesive can be used to couple the panel portion 102 to the stowage bin 110.

The quantity of fasteners 104 can depend on the size and configuration of the panel portion 102. For example, the city skyline shown in FIG. 1 includes some portions (e.g., elevated buildings) that can be more securely coupled to the exterior of the stowage bin 110 via distributing one or more fasteners 104 at positions that correspond to those portions. Additionally, when the panel portion 102 is created using heavier materials, more fasteners 104 may be used.

The set of fasteners 104 may use coupling holes positioned in the stowage bin 110 and/or the panel portion 102 when coupling the panel portion 102 to the exterior 112 of the stowage bin 110. For instance, the coupling holes can have positions on different parts of the panel portion 102 or the stowage bin 110 that enables the set of fasteners 104 to distribute the weight of panel portion 102 evenly when coupling the panel portion 102 to the stowage bin 110. Further, the coupling holes and the set of fasteners 104 can ensure that the panel portion 102 remains firmly secured to the exterior 112 of the stowage bin 110 when the stowage bin 110 is opened or closed as well as during operation of the vehicle housing the stowage bin 110.

The lighting interface 106 represents a lighting feature of the apparatus 100 that can provide illumination to enhance the visibility and appearance of the panel portion 102. In some examples, the lighting interface 106 is configured to couple to the back portion 114 of the panel portion 102 between the panel portion 102 and the exterior 112 of the stowage bin 110. For instance, the lighting interface 106 can be coupled to the back portion 114 of the panel portion 102 at a position that enables the lighting interface 106 to provide illumination through one or more openings in the panel portion 102 and ambient lighting surrounding the panel portion 102 when the panel portion 102 is coupled to the exterior 112 of the stowage bin 110. The ambient lighting can serve as a background illumination that enhances the appearance of the panel portion 102.

The lighting interface 106 can have other positions with respect to the panel portion 102 in addition to or different from those described above depending on the shape and dimension of the panel portion 102, the intended appearance, or both. For example, the lighting interface can be coupled to the back portion 114 of the panel portion 102 proximate a gap between the upper portion of the panel portion 102 and the exterior 112 of the stowage bin 110. The gap can form when part of the panel portion 102 does not couple to the exterior 112 of the stowage bin 110. As such, the gap can be range in size, such as 10 millimeters to a few centimeters. The gap can have different sizes within example implementations.

The type and configuration of the lighting interface 106 can vary within examples. The lighting interface 106 consists of one or more light emitting diodes (LEDs). For example, the lighting interface 106 can be a strip of LEDs that extends across the back portion 114 of the panel portion 102. The strip of LEDs can include different colors that enable the lighting interface 106 to provide illumination in various colors. The lighting interface 106 can illuminate portions of the panel portion 102 different colors. The lighting interface 106 can be configured to use a low amount of power to conserve power for the vehicle or for other reasons.

Further, the lighting interface 106 can receive power from a power wire connected to a power source (not shown in FIG. 1). For example, the lighting interface 106 can receive power from a power source in the vehicle that powers other lights in the vehicle housing the stowage bin 110. In another example, the power wire can connect the lighting interface 106 to other lighting interfaces associated with illuminating panel portions on other stowage bins such that all the lighting interfaces receive power from the same power source.

The lighting interface 106 can provide illumination in different colors. As such, the lighting interface 106 can provide illumination in the colors of the business that owns the vehicle housing the stowage bin 110. For example, the lighting interface 106 could provide illumination in the colors of the airline that owns the aircraft housing the stowage bin 110. In addition, the lighting interface 106 could illuminate different portions of the panel portion 102 using different colors. The colors can be programmed such that the lighting interface 106 alternates between different colors in a pattern.

Additionally, the lighting interface 106 can provide illumination in different patterns. For example, the lighting interface 106 can slowly grow brighter and dim in a pattern. The lighting interface 106 could also adjust illumination based on an operation or operations of the vehicle housing the stowage bin 110. For example, the lighting interface 106 can adjust operation during different periods of a flight. The lighting interface could change colors or brightness during take-off, landing, or mid-flight. In some examples, the lighting interface 106 could switch off or change color based on the portion of the day. In further examples, the operation of the lighting interface 106 can be controlled by a user, such as a pilot of the aircraft or the driver of the bus housing the stowage bin 110.

The apparatus 100 is shown further including the interior bin cover 108, which is configured to couple to an interior 113 of the stowage bin 110. In particular, the interior bin cover 108 can conceal the set of fasteners 104 when the fasteners 104 are coupling the panel portion 102 to the exterior 112 of the stowage bin 110. The interior bin cover 108 can enhance the interior appearance of the stowage bin 110 and can also prevent any items from incurring damage from the tops of the fasteners 104.

As shown in FIG. 1, the interior bin cover 108 includes a curvature that enables the interior bin cover 108 to align with a curvature of the interior 113 of the stowage bin 110. The interior bin cover 108 can include the matching curvature to reduce excess space between the interior bin cover 108 and the interior 113 of the stowage bin 110. Alignment with the interior 113 of the stowage bin 110 enables the interior bin cover 108 to conceal the set of fasteners 104 while minimally impacting the storage space inside the stowage bin 110. Within examples, the interior bin cover 108 can be made out of various materials, such as a light material that can be configured in a thin layer.

The apparatus 100 is shown with the stowage bin 110 to illustrate an example configuration of a stowage bin that can be located inside a vehicle. For example, the stowage bin 110 can have a location inside an aircraft, such as part of a row of stowage bins positioned above passenger seats inside the aircraft. In another example, the stowage bin 110 can have a location inside another type of vehicle, such as a commercial bus or a train. The stowage bin 110 is shown with a handle 115 that enables opening and closing of the stowage bin 110.

As shown, the exterior 112 of the stowage bin 110 can include a curvature that can help increase the storage space inside the stowage bin 110. As a result, the panel portion 102 might be designed to have a corresponding curvature that matches the curvature of the exterior 112 of the stowage bin 110 to ensure that the stowage bin 110 can open and close. In other examples, the stowage bin 110 can have other configurations. For instance, the stowage bin 110 can have a flat exterior in another example.

The configuration of the stowage bin 110 can differ with examples. In some examples, the exterior 112 of the stowage bin 110 can open in manner such that the top of the exterior 112 comes downward according to hinges positioned at the base of the stowage bin 110. As such, the apparatus 100 can have a design that accommodates the downward opening motion of the stowage bin 110. In other examples, the exterior 112 of the stowage bin 110 might open in an upward motion. As such, the design of the panel portion 102 and the apparatus 100 in general can have a configuration that accommodates the upward motion of the exterior 112 of the stowage bin 110. For example, the panel portion 102 can be a thin decorative layer that permits the door of the stowage bin 110 to open upward without causing interference with the roof of the vehicle.

Figure 2:
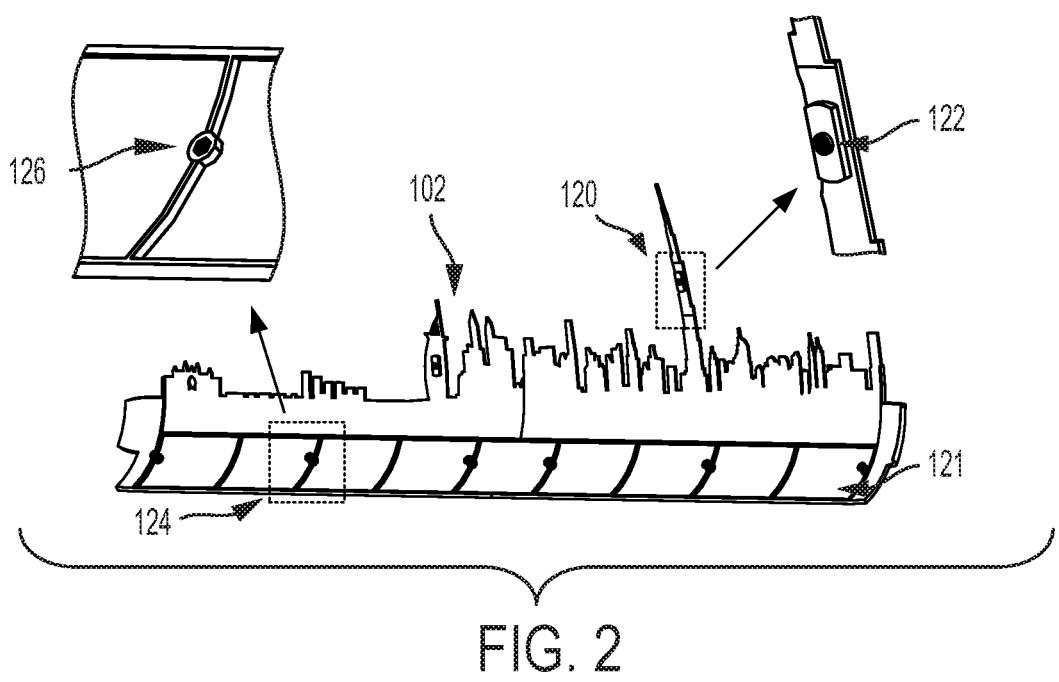
FIG. 2 is a front view of a portion of the apparatus, according to an example implementation.

FIG. 2 is a front view of the apparatus 100, according to an example implementation. In particular, the panel portion 102 of the apparatus 100 is shown with extended portion 120 and a base portion 124 further displayed in multiple close up views included to illustrate additional details. In addition, FIG. 2 also shows the panel portion 102 coupled to the exterior 112 of the stowage bin 110 in a manner in which the curvature of the panel portion 102 aligns with the curvature of the exterior 112 of the stowage bin 110.

As discussed above, the example panel portion 102 shown in FIGS. 1 and 2 is designed to represent a city skyline. In particular, the city skyline is made up of buildings that extend in a cutout manner from a base 121 of the panel portion 102. The cut out manner can make the buildings appear as if each building is extending from the base 121 of the panel portion 102 in a 3D manner. For example, the extended portion 120 represents a tall skyscraper extending from the base 121 of the panel portion 102 beyond the height of other buildings in the city skyline. As such, the extended portion 120 is shown having a coupling hole 122 for receiving and coupling a fastener of the set of fasteners 104. The coupling hole 122 can be included to ensure that a fastener securely couples the extended portion 120 to exterior 112 of the stowage bin 110. For example, the extended portion 120 of the panel portion 102 can be coupled to the exterior 112 of the stowage bin 110 using a given fastener positioned a threshold distance (e.g., 10 centimeters or more) from the set of fasteners 104 coupling the panel portion 102 to the exterior 112 of the stowage bin 110. The threshold distance can vary within examples.

The base portion 124 represents a part of the curved portion of the panel portion 102 that is configured to align with the curvature of a stowage bin 110 when the panel portion is coupled to the exterior of the stowage bin 110. As such, the base portion 124 includes a curvature to permit opening and closing of the stowage bin 110. The base portion 124 also includes a coupling hole 126 for use with a fastener of the set of fasteners 104. In other examples, the panel portion 102 can have a configuration with a curvature that aligns with the exterior 112 of the stowage bin 110 in another manner.

Figure 3:
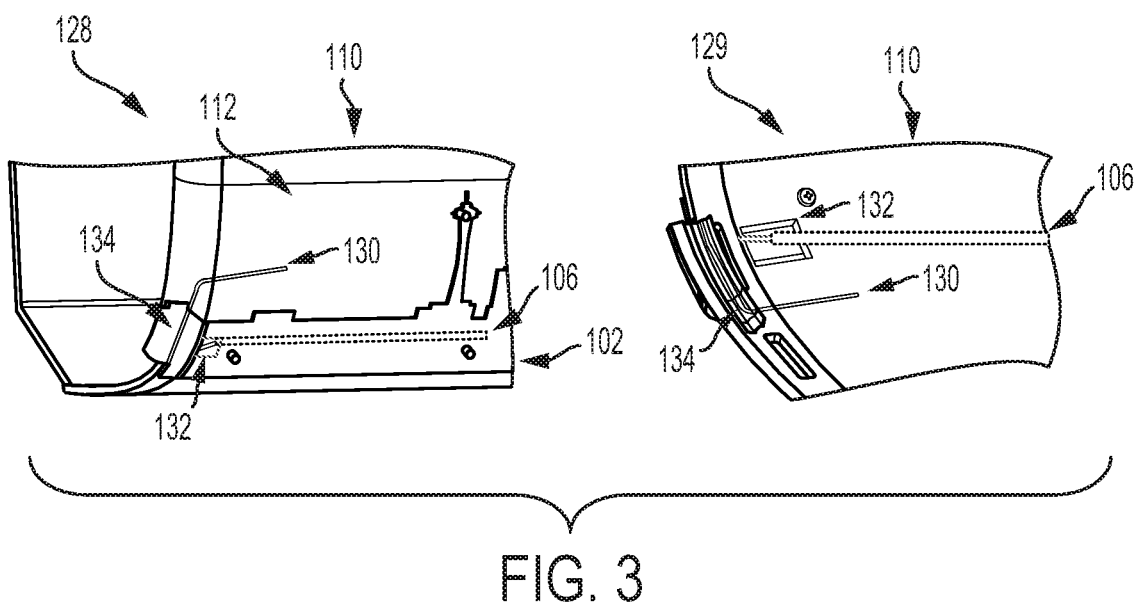
FIG. 3 illustrates a front view and an interior view of the apparatus coupled to a stowage bin, according to an example implementation.

FIG. 3 illustrates a front view 128 and an interior view 129 of the apparatus 100 coupled to the stowage bin 110, in accordance with example embodiments. The front view 128 shows the panel portion 102 coupled to the exterior 112 of the stowage bin 110 with the lighting interface 106 positioned between the panel portion 102 and the exterior 112 of the stowage bin 110. For illustration purposes, the lighting interface 106 is shown as a dotted line to represent an example position that the lighting interface 106 can have between the panel portion 102 and the stowage 110. Other example implementations can have the lighting interface 106 located at other positions.

As shown in FIG. 3, the lighting interface 106 is depicted as a strip that extends across a back portion 114 of the panel portion 102. The lighting interface 106 is further shown connected to a power wire 130, which can connect the lighting interface 106 to a power source. In the front view 128 illustrated in FIG. 3, the power wire 130 is shown extending through a side exit 132 (e.g., an opening) that is located at the back part of the rounded edge of the stowage bin 110, which is not visible to passengers. For example, the power wire 130 can extend through a side exit 132 that is positioned proximate an opening hinge of the stowage bin 110. The power wire 130 can be routed out the side of the stowage bin and through a containment extrusion 134.

The containment extrusion 134 can conceal and secure the power wire 130 during opening and closing of the stowage bin 110. For example, the containment extrusion 134 can have a position along a side of the stowage bin 110 for keeping the power wire 130 securely positioned proximate a hinge that permits the stowage bin 110 to open and close. For example, the containment extrusion can have a position within 10-100 millimeters from the hinge. In some examples, the containment extrusion 134 can be built into the hinge of the stowage bin 110. The containment extrusion 134 can help prevent luggage or other items from potentially interfering with the power wire 130, such as during moments when luggage or items are placed into or removed from the stowage bin 110. Although not shown in FIG. 3, the power wire 130 can further extend from the containment extrusion 134 and connect the lighting interface 106 to a power source.

The interior view 129 illustrated in FIG. 3 shows a different view of the apparatus 100 coupled to the stowage bin 110. In particular, the interior view 129 shows a view from inside the stowage bin 110, including the lighting interface 106 in the example position. In the interior view 129, the power wire 130 is shown extending from a connection to the lighting interface 106 positioned proximate the side exit 132 and further positioned through the containment extrusion 134. For example, the lighting interface 106 can have a position that overlaps the side exit 132 or within a few millimeters from the side exit 132 (e.g., 10-100 mm). As indicated above, the small containment extrusion 134 can hide and secure the power wire 130 along the side of the stowage bin 110 in a position that is not visible when viewing the panel portion 102.

In other examples, the power wire 130 can be located along different portions of the stowage bin 110 to conceal and protect the power wire 130. As an example, another implementation can involve the lighting interface 106 built into the panel portion 102 of the apparatus 100. As such, the power wire 130 can also be placed into a channel built into the panel portion 102 and routed out a side of the extended portion 120 along a side of the stowage bin 110 for connection with a power source.

Figure 4:
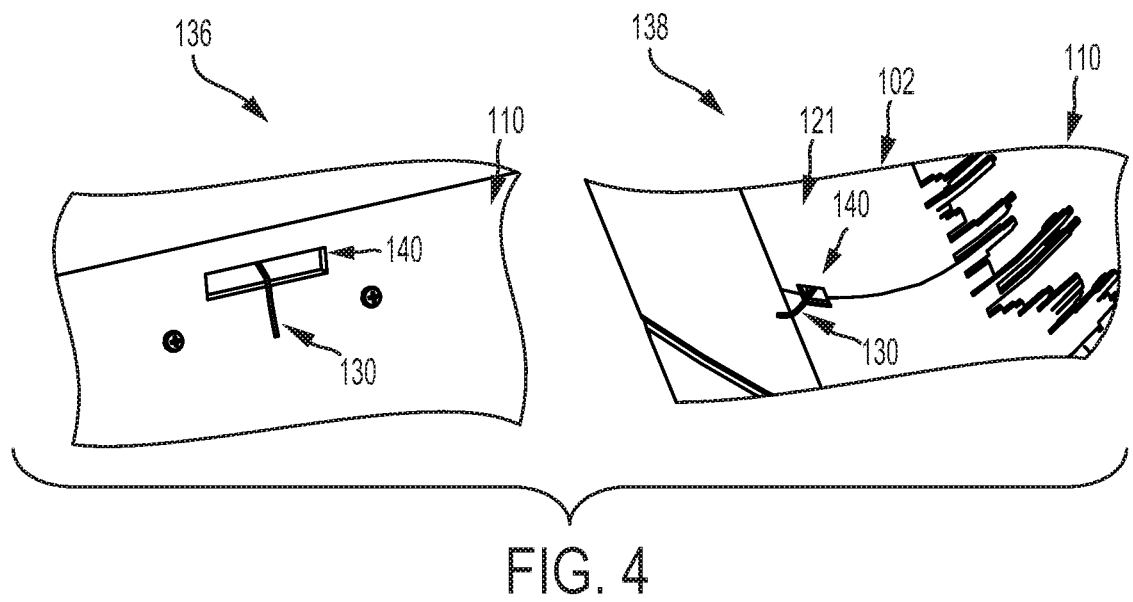
FIG. 4 illustrates an interior view and a rear view of the apparatus coupled to the stowage bin, according to an example implementation.

FIG. 4 illustrates an interior view 136 and an under view 138 of the apparatus 100 coupled to the stowage bin 110, in accordance with example embodiments. Similar to FIG. 3, FIG. 4 depicts possible routes for positioning the power wire 130 in a manner that protects and conceals the power wire 130. In particular, the interior view 136 shows the power wire 130 extending through a bottom slot 140 (i.e., a back exit) in the stowage bin 110. Since the back of the stowage bin 110 might not be visible to passengers, the power wire 130 can be routed out the back of the stowage bin 110 through the bottom slot 140 hidden from the view of passengers. As shown in FIG. 4, the bottom slot 140 is located at a position near where the base 121 of the extended portion 120 aligns with the exterior 112 of the stowage bin 110.

In addition, the under view 138 represents another view of the power wire 130 extending through the bottom slot 140 positioned near the base 121 of the panel portion 102. The power wire 130 can connect to a power source from upon extending through the bottom slot 140. In some examples, the power wire 130 can enter and extend through the hinge of the stowage bin 110. In such a configuration, the power wire 130 can continue through an interior of the stowage bin 110 and connect to a power source.

Figure 5:
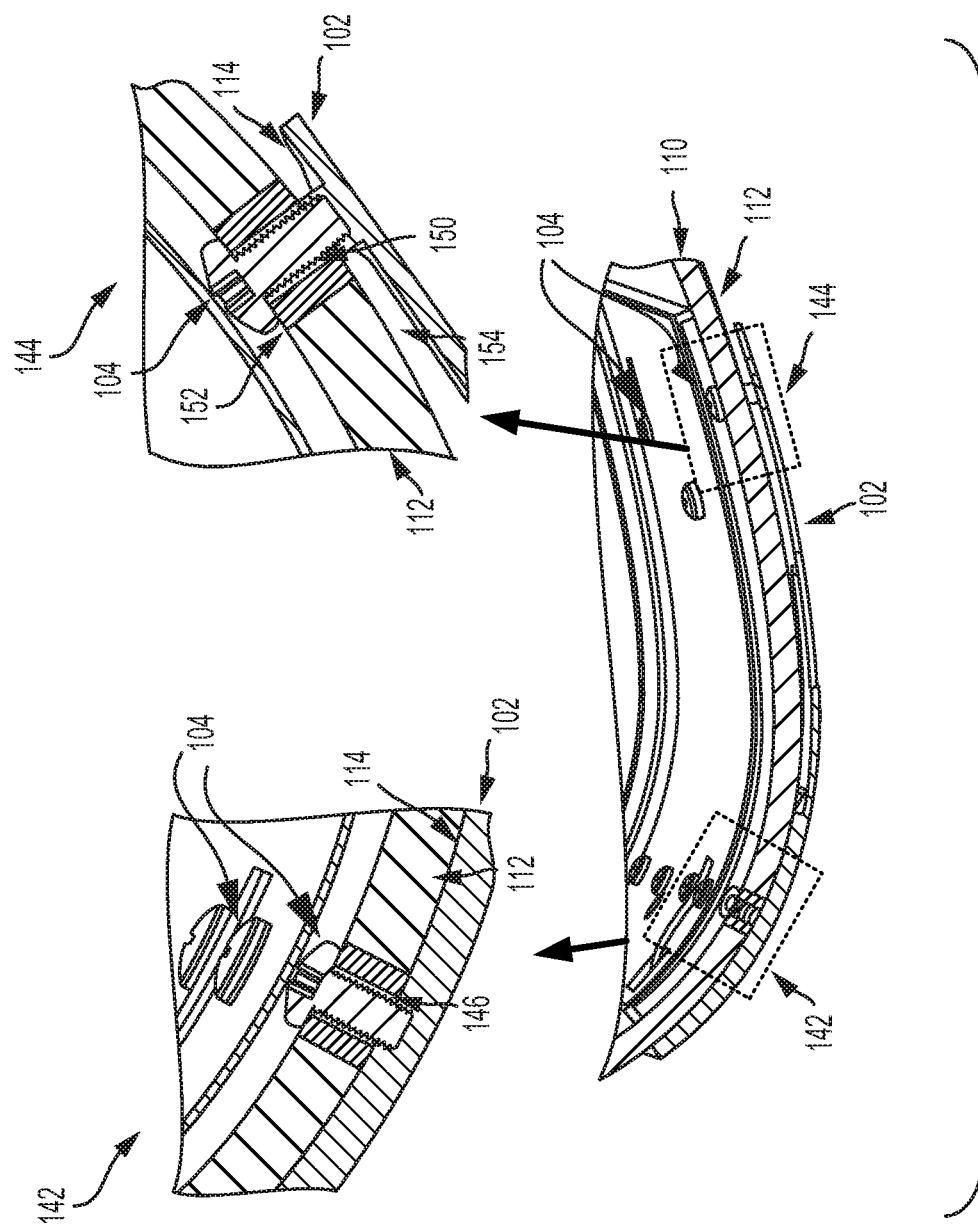
FIG. 5 illustrates the set of fasteners coupling the panel portion to the exterior of the stowage bin, according to an example implementation.

FIG. 5 illustrates the set of fasteners 104 coupling the panel portion 102 to the exterior 112 of the stowage bin 110, in accordance with example embodiments. The set of fasteners 104 are shown extending from an interior of the stowage bin 110 into a back portion 114 of the panel portion 102.

Additionally, FIG. 5 further shows section 142 and section 144, which each represent a focused view of a portion of the apparatus 100 to illustrate additional details about the using the set of fasteners 104 to couple the panel portion 102 to the exterior 112 of the stowage bin 110. In other examples, different types of fasteners or coupling-agents can be used. For instance, another example can involve the use of magnetic coupling-agents to connect the panel portion 102 to the stowage bin 110.

The set of fasteners 104 are shown extending from an interior of the stowage bin 110 into the back portion 114 of the panel portion 102. In such a configuration, the set of fasteners 104 can be arranged to extend through the door of the stowage bin 110 and into the panel portion 102 to secure the panel portion 102 to the exterior 112 of the stowage bin 110. By extending from an interior of the stowage bin 110, each fastener is not visible when viewing the panel portion 102 since only a portion of each fastener extends into the panel portion 102. Further, as discussed above, some example implementations further involve using an interior bin cover 108 that can conceal the set of fasteners 104 even when one views the interior of the stowage bin 110.

To further illustrate the use of a fastener 104, section 142 represents a zoomed-in view of a portion of the apparatus 100 coupled to the stowage bin 110. In particular, section 142 shows a fastener 104 extending through the stowage bin 110 via a coupling hole 146 and into a back portion of the panel portion 102. The coupling hole 146 can serve to guide and maintain a position of the fastener 104.

In the example shown in FIG. 5, the coupling hole 146 is a potted insert that can help guide and secure the fastener 104 through the stowage bin 110 when coupling the panel portion 102 to the exterior 112 of the stowage bin 110. The coupling hole 146 is further shown having a diameter that exceeds the diameter of the fastener 104. The extra space in the diameter of the coupling hole 146 can allow for minor adjustments in the position of the panel portion 102 that can be needed when coupling and aligning the panel portion 102 to the exterior 112 of the stowage bin 110. As a result, the extra space permitted by the coupling hole 146 can enable the panel portion 102 to be attached to securely fit against the exterior 112 of the stowage bin 110 as desired.

Similar to section 142, section 144 represents a zoomed-in view of another portion of the apparatus 100 coupled to stowage bin 110. Section 144 shows a fastener 104 extending through the stowage bin 110 via a coupling hole 150 and into a back portion 114 of the panel portion 102. Similar to the coupling hole 146 shown in section 142, the coupling hole 150 can be a potted insert that includes an inside diameter that permits adjustments in the position of the panel portion 102 for alignment purposes.

As further shown in section 144, a back portion 114 of the panel portion 102 can include one or more raised portions such that a gap 154 exists between an upper portion of the panel portion 102 and the exterior of the stowage bin 110. In some instances, the gap 154 can help enhance the visual appearance of the panel portion 102 in a variety of ways. For example, the lighting interface 106 can provide illumination in an area containing the gap 154 such that portions of the panel portion 102 might be enhanced by ambient lighting. Further, the gap 154 can also cause portions of the panel portion 102 to appear 3D extending from the surface of the exterior of 112 of the stowage bin 110.

Figure 6:
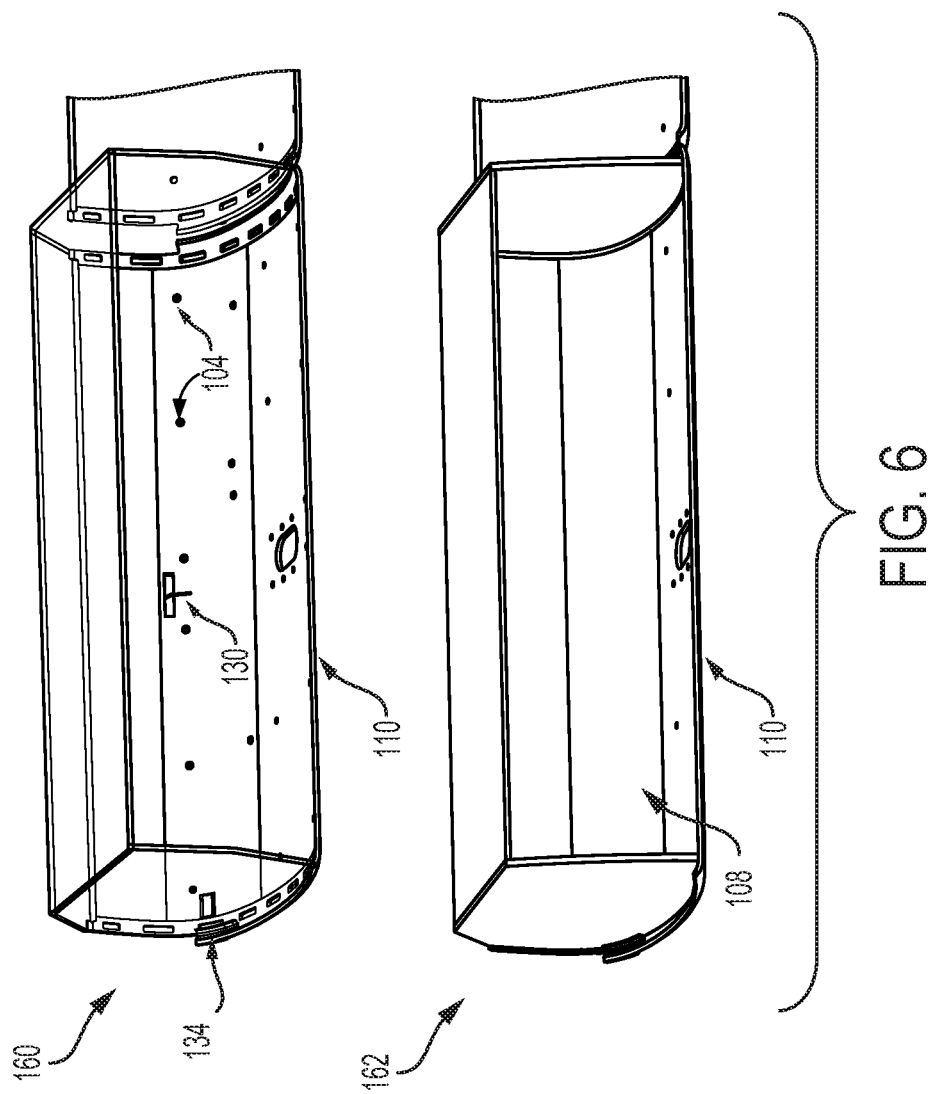
FIG. 6 illustrates a first view and a second view of the apparatus coupled to the stowage bin, according to an example implementation.

FIG. 6 illustrates a first view 160 and a second view 162 of the apparatus 100 coupled to the stowage bin 110, in accordance with examples disclosed herein. In particular, the first view 160 shows an interior view of the stowage bin with the panel portion 102 coupled to the exterior of the stowage bin 110 via the set of fasteners 104 without an interior bin cover 108. On the other hand, the second view 162 further shows the interior bin cover 108 covering the set of fasteners 104 making the set no longer visible when looking into the interior of the stowage bin 110.

As shown in FIG. 6, the first view 160 shows the interior of the stowage bin 110. In particular, the upper portion of the exterior 112 of the stowage bin 110 is shown at a downward angle such that the interior of the stowage bin 110 where the panel portion 102 is connected is shown. The set of fasteners 104 are shown arranged in a configuration that extends across the interior of the stowage bin 110. The first view 160 further shows the power wire 130 extending through the bottom slot 140. The power wire 130 can connect to a power source from upon extending through the bottom slot 140.

The second view 162 further shows the interior of the stowage bin 110 with the addition of the interior bin cover 108. The interior bin cover 108 is shown concealing the set of fasteners 104. In other examples, the configuration of the interior bin cover 108 can differ.

FIG. 7 illustrates a system 200, in accordance with example embodiments. The system 200 represents another example stowage bin lighted branding feature and includes a panel portion 202 coupled to a stowage bin 204 configured with handle 208. The system 200 can further include components not shown in FIG. 7, such as one or more lighting interfaces, power wires, and fasteners, among others.

The panel portion 202 of the system 200 includes text 212 representing a "LOGO" that can be associated with an entity using the system 200 to modify the appearance of the stowage bin 204 (e.g., bottom portion 206 of the stowage bin 204). For instance, the text 212 can represent information that the owner of the vehicle configured with the stowage bin 204 wishes to convey. In some instances, the text 212 can represent symbols, advertisements, or other information. In further examples, the panel portion 202 can include a changeable interface. In particular, the interface can alternate between different visuals similar to a graphical user interface on a computing device.

As shown in the close view 210, the text 212 can extend across the panel portion 202. In other examples, the text 212 can be part of a larger design or can be configured differently on the panel portion 202. Further, the text 212 can be etched into the panel portion 202 or can correspond to materials applied on top of the panel portion 202. In some examples, the text 212 can be a transparent or semi-transparent material enabling illumination from the lighting interface of the system 200 to illuminate the text 212.

FIG. 8 illustrates multiple views of the panel portion 202. In particular, the multiple views includes a back view 214 of the panel portion 202, a top view 216 of the panel portion 202, a first cut away view 218 of the panel portion 202, and a second cut away view 220 of the panel portion 202. The multiple views are shown in FIG. 8 to further illustrate aspects of the panel portion 202 of the system 200. In other examples, the panel portion 202 can have other configurations.

The back view 214 shows a back portion 224 of the panel portion 202. As shown, the text 212 can be generated as an indented portion of the panel portion 202. For instance, the text 212 can include openings that enable light from one or more lighting interfaces in the system 200 to illuminate the openings. Further, the text 212 can also include a transparent or translucent material that enables illumination to enhance the appearance of the text 212.

The top view 216 shows the panel portion 202 connected to the stowage bin 204 of the system 200. As shown, the panel portion 202 can include a curvature that enables the panel portion 202 to fit and align with the exterior of the stowage bin 204.

The first cut away view 218 shows a portion of the panel portion 202. In particular, the portion shows raised portions of the back portion 224 of the panel portion 202 that can create gaps (e.g., gap 226) when the panel portion 202 is connected to the stowage bin 204. Similar to the first cut away view 218, the second cut away view 220 shows the portion of the panel portion 202 from another view, including the raised portions of the back portion 224 of the panel portion 202 creating the gap 226.

FIG. 9 illustrates an additional apparatus inside a vehicle, according to an example implementation. The apparatus 302 represents another example of a stowage bin lighted branding feature positioned on stowage bins inside a part of a vehicle 300. As shown in FIG. 9, the design of the apparatus 302 extends up to a top portion of the exterior of the stowage bin 304.

The example vehicle 300 can represent any type of vehicle that can include one or more stowage bins 304. For example, the vehicle 300 can correspond to an aircraft, bus, train, or another type of vehicle. As shown, the vehicle 300 includes the apparatus 302 coupled to two stowage bins 304 positioned above seats 306s. The vehicle 300 further includes windows 308 and lighting and air controls 310. Although the stowage bins 304 are shown above the seats 306 in FIG. 9, other examples can have the stowage bins positioned at other locations within the vehicle 300.

FIG. 10 shows a flowchart of a method, according to an example implementation. Method 400 shown in FIG. 10 presents an example of a method that could be used with the apparatus 100 shown in FIGS. 1-6, the system 200 shown in FIGS. 7-8, or the apparatus 300 shown in FIG. 9. In other examples, components of the devices and/or systems may be arranged to be adapted to, capable of, or suited for performing the functions, such as when operated in a specific manner.

Method 400 may include one or more operations, functions, or actions as illustrated by one or more of blocks 402 and 404. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

At block 402, the method 400 involves coupling a panel portion to an exterior of a stowage bin using a set of fasteners such that a curvature of the panel portion aligns with a curvature of the exterior of the stowage bin. Coupling the panel portion to the exterior of the stowage bin can involve arranging each fastener to extend through the stowage bin into a back portion of the panel portion to couple the panel portion to the exterior of the stowage bin. The arrangement of the fasteners can depend on the design of the panel portion. For example, fasteners can be used to securely couple portions of the panel portion that extend away from a base of the panel portion to the exterior of the stowage bin. In addition, aligning the curvature of the panel portion with the curvature of the exterior of the stowage bin can enable the stowage bin to open and close when the panel portion is coupled to the exterior of the stowage bin.

At block 404, the method 400 involves coupling a lighting interface to the back portion of the panel portion between the panel portion and the exterior of the stowage bin at a position that enables the lighting interface to provide illumination through one or more openings in the panel portion and ambient lighting surrounding the panel portion.

In some examples, the lighting interface can be positioned near one or more gaps created between the back portion of the panel portion and the exterior of the stowage bin when the panel portion is coupled to the stowage bin. In particular, the back portion of the panel portion can include raised portions or another physical design that causes the gaps to be created when the back portion of the panel portion is attached to the exterior of the stowage bin. As such, the lighting interface can have a position near the one or more gaps and provide illumination in a manner that creates ambient lighting that fills the gaps and illuminates aspects of the panel portion.

FIG. 11 shows a flowchart of an example method for use with the method 400, according to an example embodiment. At block 406, functions include generating a panel having a width that corresponds to a width of the exterior of the stowage bin using an injection molding process. For example, the panel can be a plastic material generated at a size that matches the size of a portion of the exterior of the stowage bin.

At block 408, functions include modifying the panel to form the panel portion using a water jetting process. The water jetting process can involve an industrial tool capable of cutting a wide variety of materials using a high-pressure jet of water or a mixture of water and an abrasive substance. The water jetting process can carve and cut a design into the panel.

Figure 12:
FIG. 12 shows a flowchart of another method for use with the method shown in FIG. 10, according to an example implementation.

FIG. 12 shows a flowchart of an example method for use with the method 400, according to an example embodiment. At block 410, functions include modifying operation of the lighting interface based on a status of operation of a vehicle configured with the stowage bin, wherein modifying operation of the lighting interface comprises adjusting a brightness or color of illumination provided by the lighting interface. For example, modifying operation of the lighting interface can depend on operations of the vehicle housing the stowage bin. As an example, the lighting interface can operate in a first operation mode when the vehicle is traveling and a second operation mode when the vehicle is stationary.

By the term "substantially" or "about" used herein, it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. An apparatus comprising:
   a panel portion;
   a set of fasteners configured to couple the panel portion to an exterior of a stowage bin such that a curvature of the panel portion aligns with a curvature of the exterior of the stowage bin, wherein each fastener is configured to extend through the stowage bin into a back portion of the panel portion to couple the panel portion to the exterior of the stowage bin, and wherein aligning the curvature of the panel portion with the curvature of the exterior of the stowage bin enables the stowage bin to open and close when the panel portion is coupled to the exterior of the stowage bin; and
   a lighting interface configured to couple to the back portion of the panel portion between the panel portion and the exterior of the stowage bin at a position that enables the lighting interface to provide illumination through one or more openings in the panel portion and ambient lighting surrounding the panel portion when the panel portion is coupled to the exterior of the stowage bin.

2. The apparatus of claim 1, further comprising:
   an interior bin cover configured to couple to an interior of the stowage bin such that the interior bin cover conceals the set of fasteners when the set of fasteners are coupling the panel portion to the exterior of the stowage bin, wherein the interior bin cover includes a curvature that enables the interior bin cover to align with a curvature of the interior of the stowage bin.

3. The apparatus of claim 1, wherein the back portion of the panel portion includes one or more raised portions such that a gap exists between an upper portion of the panel portion and the exterior of the stowage bin when the set of fasteners are coupling the panel portion to the exterior of the stowage bin.

4. The apparatus of claim 3, wherein the lighting interface is coupled to the back portion of the panel portion proximate the gap between the upper portion of the panel portion and the exterior of the stowage bin.

5. The apparatus of claim 1, wherein a power wire of the lighting interface extends to a power source through an opening in a side-end of the stowage bin when the panel portion is coupled to the exterior of the stowage bin, and wherein the opening in the side-end of the stowage bin is positioned proximate an opening hinge of the stowage bin such that the power wire of the lighting interface remains stationary when the stowage bin is opened or closed.

6. The apparatus of claim 5, wherein the power wire further extends through a containment extrusion positioned exterior from the stowage bin and proximate the opening hinge of the stowage bin, and wherein the containment extrusion aligns and conceals the power wire outside the stowage bin.

7. The apparatus of claim 1, wherein a power wire of the lighting interface extends to a power source through an opening in the stowage bin positioned behind the panel portion and proximate a central opening hinge of the stowage bin when the panel portion is coupled to the exterior of the stowage bin such that the power wire of the lighting interface remains stationary when the stowage bin is opened or closed.

8. The apparatus of claim 1, wherein the lighting interface is configured to provide illumination through the one or more openings in the panel portion and ambient lighting surrounding the panel portion in one or more colors and one or more patterns.

9. The apparatus of claim 1, wherein an amount of the curvature of the panel portion depends on an amount of the curvature of the stowage bin.

10. The apparatus of claim 1, wherein an extended portion of the panel portion is coupled to the exterior of the stowage bin using a given fastener positioned a threshold distance from the set of fasteners coupling the panel portion to the exterior of the stowage bin such that the extended portion of the panel portion is securely coupled to the exterior of the stowage bin.

11. A system comprising:
    a stowage bin;
    one or more fasteners;
    a panel portion coupled to an exterior of the stowage bin via the one or more fasteners such that a curvature of the panel portion aligns with a curvature of the exterior of the stowage bin, wherein each fastener extends through the stowage bin and into a back portion of the panel portion in order to couple the panel portion to the exterior of the stowage bin, and wherein aligning the curvature of the panel portion with the curvature of the exterior of the stowage bin enables the stowage bin to open and close; and
    a lighting interface coupled to the back portion of the panel portion between the panel portion and the exterior of the stowage bin at a position that enables the lighting interface to provide illumination through one or more openings in the panel portion and ambient lighting surrounding the panel portion.

12. The system of claim 11, further comprising:
    a second stowage bin, wherein the second stowage bin is positioned next to the stowage bin;
    a second set of fasteners;
    a second panel portion coupled to an exterior of the second stowage bin via the second set of fasteners, wherein the second panel portion corresponds to a second part of a mural, and wherein the panel portion corresponds to a first part of the mural.

13. The system of claim 11, further comprising:
    an interior bin cover coupled to an interior of the stowage bin such that the interior bin cover conceals the one or more fasteners coupling the panel portion to the exterior of the stowage bin, wherein the interior bin cover includes a curvature that aligns with a curvature of the interior of the stowage bin.

14. The system of claim 11, wherein the back portion of the panel portion includes one or more raised portions such that a gap exists between an upper portion of the panel portion and the exterior of the stowage bin.

15. The system of claim 11, wherein a power wire of the lighting interface extends to a power source through an opening in a side-end of the stowage bin, and wherein the opening in the side-end of the stowage bin is positioned proximate an opening hinge of the stowage bin such that the power wire of the lighting interface remains stationary when the stowage bin is opened or closed.

16. The system of claim 15, wherein the power wire further extends through a containment extrusion positioned exterior from the stowage bin and proximate the opening hinge of the stowage bin, and wherein the containment extrusion aligns and conceals the power wire outside the stowage bin.

17. The system of claim 11, wherein the lighting interface is configured to provide illumination through the one or more openings in the panel portion and ambient lighting surrounding the panel portion in one or more colors and one or more patterns.

18. A method comprising:
coupling a panel portion to an exterior of a stowage bin using a set of fasteners such that a curvature of the panel portion aligns with a curvature of the exterior of the stowage bin, wherein coupling the panel portion to the exterior of the stowage bin involves arranging each fastener to extend through the stowage bin into a back portion of the panel portion to couple the panel portion to the exterior of the stowage bin, and wherein aligning the curvature of the panel portion with the curvature of the exterior of the stowage bin enables the stowage bin to open and close when the panel portion is coupled to the exterior of the stowage bin; and
coupling a lighting interface to the back portion of the panel portion between the panel portion and the exterior of the stowage bin at a position that enables the lighting interface to provide illumination through one or more openings in the panel portion and ambient lighting surrounding the panel portion.

19. The method of claim 18, further comprising:
generating a panel having a width that corresponds to a width of the exterior of the stowage bin using an injection molding process; and
modifying the panel to form the panel portion using a water jetting process.

20. The method of claim 18, further comprising:
modifying operation of the lighting interface based on a status of operation of an aircraft configured with the stowage bin, wherein modifying operation of the lighting interface comprises:
adjusting a brightness or a color of illumination provided by the lighting interface.

* * * * *